United States Patent Office 3,364,411
Patented Jan. 16, 1968

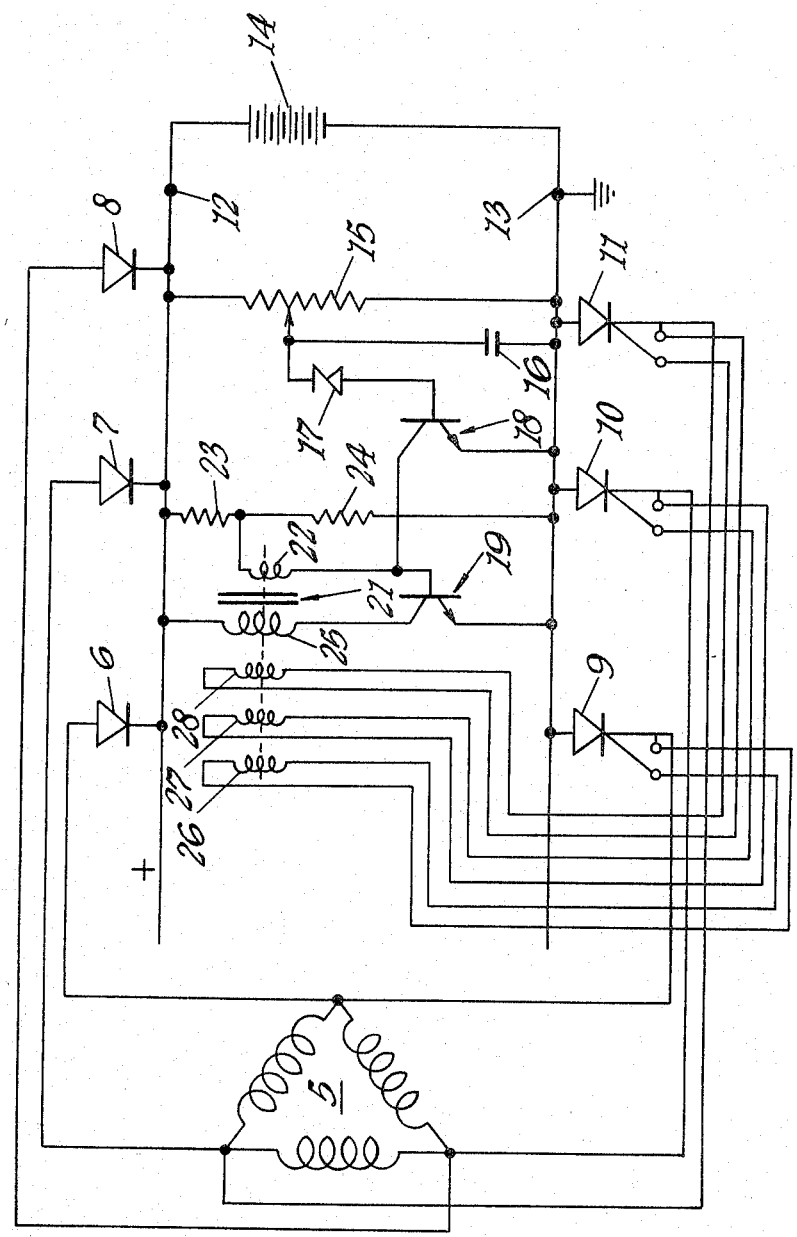

3,364,411
BATTERY CHARGING SYSTEMS
Maurice James Wright, Birmingham, England, assignor to Joseph Lucas (Industries) Limited, Birmingham, England
Filed Mar. 30, 1965, Ser. No. 443,829
Claims priority, application Great Britain, May 13, 1964, 19,847/64
1 Claim. (Cl. 320—61)

ABSTRACT OF THE DISCLOSURE

In a battery charging system a multi-phase alternator supplies power to the battery through a full wave rectifier including a number of diodes and a number of controlled rectifiers. If the battery voltage is below a predetermined value, an oscillator supplies power to the gates of the controlled rectifiers to hold them conductive, but if the battery voltage exceeds the predetermined value, the oscillator is stopped so that the controlled rectifiers cease to conduct. The controlled rectifiers have a common anode connection to a supply line, and the oscillator includes individual secondary windings connected to the gates of the controlled rectifiers respectively.

---

In Patent No. 3,315,141 I have claimed a battery charging system of the kind including a permanent magnet alternator supplying power through a full-wave rectifier to a battery, including at least one controlled rectifier forming part of said rectifier and through the anode-cathode path of which current flows to the battery, comprising a power supply derived from the battery and connected to the gate of the controlled rectifier to permit the controlled rectifier to conduct, and means operable when the battery voltage exceeds a predetermined value for preventing the controlled rectifier from being rendered conductive.

The examples described in Patent No. 3,315,141 all show three-phase alternators in which the three controlled rectifiers in the full wave rectifier have their cathodes interconnected to provide one supply line to the battery, the other supply line being from the anodes of three diodes completing the full wave rectifier. Whilst such a construction can satisfactorily be made, the physical construction of a controlled rectifier is such that it is more convenient to make a common connection to the anodes of a plurality of controlled rectifiers. At first sight it appears that all that is required to achieve such an arrangement is to interchange the diodes and rectifiers, but if this is done the circuit will not work satisfactorily because of the variations in cathode potential of the rectifiers. This problem is overcome in the present invention by using an oscillator to fire the controlled rectifiers, with the power from the oscillator fed to the rectifiers by way of a transformer having individual secondary windings connected between the gates and cathodes of the rectifiers respectively. Because individual secondary windings are used, the variations in cathode potential do not matter.

The accompanying drawing is a circuit diagram illustrating one example of the invention as applied to a battery charging system utilizing a three-phase delta-connected permanent magnet alternator.

Referring to the drawing, the phase lines of the alternator 5 are connected to the anodes of first, second and third diodes 6, 7, 8 respectively and to the cathodes of first, second and third controlled rectifiers 9, 10, 11 respectively. The cathodes of the diodes are connected to a positive supply terminal 12, whilst the anodes of the controlled rectifiers are connected to a negative supply terminal 13. In use, a battery 14 is connected across the terminals 12, 13, and the terminal 13 is earthed.

Connected across the terminals 12, 13 is a resistor 15 having a variable point thereon connected to the terminal 13 through a capacitor 16, and also connected through the cathode and anode of a Zener diode 17 to the base of an n-p-n transistor 18 having its emitter connected to the terminal 13. The collector of the transistor 18 is connected to the base of a second n-p-n transistor 19 having its emitter connected to the terminal 13. Associated with the transistor 19 is a transformer 21 having a first winding 22 through which the base of the transistor 19 is connected to a point intermediate a pair of resistors 23, 24 bridging the terminals 12, 13, a second winding 25 through which the collector of the transistor 19 is connected to the terminal 12, and third, fourth and fifth windings 26, 27, 28 connected respectively between the gates and cathodes of the controlled rectifiers 9, 10, 11.

In operation, when the voltage between the terminals 12, 13 is below a value predetermined by the position of the slider on the resistor 15, the Zener diode 17 does not conduct and so no base current flows to the transistor 18, which is therefore off. Base current flows in the transistor 19, which with the primary wnding 25 and feedback winding 22 forms an oscillator the frequency of which is considerably in excess of the frequency of the alternator 5. The oscillator serves through the windings 26, 27, 28 to provide gate-cathode current to the controlled rectifiers 9, 10, 11, which behave in effect as diodes. Thus, each rectifier 9, 10, 11 is reverse biased during one half-cycle of the supply, and at the commencement of the next half-cycle is fired substantially instantaneously by the oscillator. It will be noted that a separate winding 26, 27, 28 must be used for each rectifier 9, 10, 11 because their cathode potentials vary. Because separate windings 26, 27, 28 are used, the magnitude of the gate-cathode voltage applied by the oscillator to a rectifier 9, 10, 11 is independent of the cathode potential of the rectifier 9, 10, 11.

When the voltage between the terminals 12, 13 exceeds the predetermined value, the Zener diode 17 conducts and base current flows in the transistor 18. The base current of the transistor 19, is now diverted through the collector and emitter of the transistor 18, and so the oscillator ceases to operate. The rectifiers 9, 10, 11 now remain off when they are reverse biased, and stay off until the voltage between the terminals 12, 13 falls below the predetermined value, at which point the oscillator operates again. The capacitor 16 ensures that the initial surge of current when the oscillator operates does not break down the Zener diode 17 unless the mean voltage between the terminals 12, 13 is above the predetermined value.

Having thus described my invention what I claim as new and desire to secure by Letters Patent is:

1. Battery charging apparatus comprising in combination a multi-phase permanent magnet alternator, a positive supply line, a negative supply line, a full wave rectifier through which said permanent magnet alternator supplies power to said supply lines, said full wave rectifier including a plurality of diodes connected between the phases of said alternator and said positive supply line, and a plurality of controlled rectifiers connected between the phases of said alternator and said negative supply line, with the anodes of said controlled rectifiers all connected to said negative supply line, a battery connected across said supply lines, an oscillator connected across said supply lines and deriving its power from said battery, said oscillator including a primary winding and a number of secondary windings equal in number to the number of controlled rectifiers, the secondary windings being connected between the gates and cathodes of said controlled rectifiers respectively, and said oscillator operating to permit the controlled rectifier to conduct, said system further including means operable when the battery voltage exceeds a predetermined value for stopping operation of said oscillator.

References Cited

UNITED STATES PATENTS

| | | | |
|---|---|---|---|
| 3,223,922 | 12/1965 | Borden | 322—72 |
| 3,254,293 | 5/1966 | Steinbruegge et al. | 322—28 |
| 3,315,141 | 4/1967 | Wright et al. | 320—61 |

FOREIGN PATENTS 973,013　10/1964　Great Britain.

LEE T. HIX, *Primary Examiner.*

R. V. LUPO, *Assistant Examiner.*